United States Patent
DeFalco et al.

(10) Patent No.: US 12,361,360 B2
(45) Date of Patent: Jul. 15, 2025

(54) SYSTEM AND METHOD OF DETERMINING PARTNER INFLUENCE

(71) Applicant: Crossbeam, Inc., Philadelphia, PA (US)

(72) Inventors: Lindsey DeFalco, Landenberg, PA (US); Francis Ryan, Media, PA (US); Christopher Samila, Saint Simons Island, GA (US); Robert J. Moore, Haddonfield, NJ (US)

(73) Assignee: Crossbeam, Inc., Philadelphia, PA (US)

( * ) Notice: Subject to any disclaimer, the term of this patent is extended or adjusted under 35 U.S.C. 154(b) by 222 days.

(21) Appl. No.: 17/971,434

(22) Filed: Oct. 21, 2022

(65) Prior Publication Data

US 2023/0128419 A1  Apr. 27, 2023

Related U.S. Application Data

(60) Provisional application No. 63/272,095, filed on Oct. 26, 2021.

(51) Int. Cl.
*G06Q 10/00* (2023.01)
*G06Q 10/0637* (2023.01)
*G06Q 10/10* (2023.01)

(52) U.S. Cl.
CPC ......... *G06Q 10/0637* (2013.01); *G06Q 10/10* (2013.01)

(58) Field of Classification Search
None
See application file for complete search history.

(56) References Cited

U.S. PATENT DOCUMENTS

| 8,200,527 | B1 | 6/2012 | Thompson et al. | |
|---|---|---|---|---|
| 2008/0177589 | A1* | 7/2008 | Durvasula | G06Q 30/02 705/7.29 |
| 2013/0144880 | A1* | 6/2013 | Kemmer | G06Q 10/06 707/737 |
| 2013/0231974 | A1* | 9/2013 | Harris | G06Q 30/0201 705/7.29 |
| 2014/0142997 | A1* | 5/2014 | Shunk | G06Q 10/063 705/7.11 |
| 2014/0180761 | A1* | 6/2014 | Yolles | G06Q 50/06 705/7.29 |
| 2014/0244351 | A1* | 8/2014 | Symons | G06Q 30/0201 705/7.29 |

(Continued)

OTHER PUBLICATIONS

R Gulati (Alliances and networks)—Strategic management journal, 1998—Wiley Online Library. (Year: 1998).*

(Continued)

*Primary Examiner* — Hafiz A Kassim
(74) *Attorney, Agent, or Firm* — Womble Bond Dickinson (US) LLP

(57) ABSTRACT

A system and method of attributing an influence that a partner has on an account, are described. The method includes receiving activity data indicating interactions between the partner and the account. The activity data is used to determine the influence that the partner has on the account. A report is transmitted for display, and the report includes influence data indicating the influence of the partner on the account. Other embodiments are also described and claimed.

16 Claims, 7 Drawing Sheets

(56) References Cited

U.S. PATENT DOCUMENTS

| | | | | |
|---|---|---|---|---|
| 2016/0335674 | A1* | 11/2016 | Plourde | G06Q 30/0251 |
| 2017/0236081 | A1* | 8/2017 | Grady Smith | G06Q 10/0637 |
| | | | | 705/7.36 |
| 2019/0362290 | A1* | 11/2019 | Rogynskyy | H04L 43/045 |
| 2020/0293621 | A1 | 9/2020 | Ayers et al. | |
| 2020/0364755 | A1* | 11/2020 | Ferris | G06Q 30/0609 |
| 2022/0200969 | A1* | 6/2022 | Davey | H04L 63/0428 |

OTHER PUBLICATIONS

Assunção Marcos D et al: "Big Data computing and clouds : Trends and future directions", Journal of Parallel and Distributed Computing, Elsevier, Amsterdam, NL, vol. 79, Aug. 27, 2014 (Aug. 27, 2014), pp. 3-15, XP029183065, ISSN: 0743-7315, DOI: 10.1016/J.JPDC.2014.08.003, p. 1-pp. 7,10-11.
International Search Report and Written Opinion of Application No. PCT/US2022/047611, mailed Feb. 1, 2023, 9 pages.

* cited by examiner

FIG. 6

SYSTEM AND METHOD OF DETERMINING PARTNER INFLUENCE

This application claims the benefit of priority of U.S. Provisional Patent Application No. 63/272,095, filed on Oct. 26, 2021, which is incorporated herein by reference in its entirety to provide continuity of disclosure.

BACKGROUND

Field

This application relates generally to system and methods for mapping data in a partner ecosystem, and more particularly, for determining a level of impact that partners within the partner ecosystem have on the partnerships within the ecosystem.

Background Information

Organizations collaborate with other organizations. Organizations collaborate with partners at other organizations. For example, Company A and Company B may have overlap between customer pipelines (like shared prospective customers), or may collaborate to develop such overlaps. An overlaps can be a good indicator that the companies have a potential partnership. That is, Company A and Company B may be partners having an overlap of Company C that they both have some relation to. Company A and Company B can provide assistance to each other to further relationships, e.g., sales relationships, to Company C. For example, if Company C is a customer of Company A, a representative of Company A can: introduce Company B to Company C, give strategic advice to help Company B sell to Company C, or cross sell to Company C in collaboration with Company B by encouraging the purchase of complementary offerings. Another, non-sales, example is a co-marketing effort in which joint marketing efforts of Company A increases awareness and drives more pipeline to Company B. These contributions by Company A can have an influence on sales by Company B to Company C. Tracking and assessing contributions of partners to sales revenue has historically been done through manual attribution tracking, which requires companies to attempt to manually determine and record contributions to shared accounts to assess credit for such contribution (attribution). This process can be a manual and tedious process that requires time-consuming phone calls, spreadsheet comparisons, screen shares, etc. Partner influence on accounts is typically recorded manually in disparate systems and there is typically no standardization across companies on how the tracking is performed. Additionally, individual activities, e.g., conversations, phone calls, emails, etc., that contributed to the partner influence on accounts are typically not tracked (or are difficult to obtain information about), and thus, are not used to prove the partner influence.

SUMMARY

Existing techniques for determining partner influence on overlapping accounts are inaccurate, insecure, unscalable, and exhausting to perform. The recordation of whether a particular partner influenced a sale, or otherwise generated net new pipeline, is often based on anecdotal data and provides only a binary determination of "yes" the partner did influence the sale, or "no" the partner did not influence the sale. Attribution that results from such tracking typically reports potential revenue for overlaps between partners without accurately determining "true attribution," which is credit that can be provided for actual revenue generated by such overlaps. Accordingly, there is a need for a method of tracking and calculating attribution using data that can be automatically (and not otherwise easily) obtained, and that determines in a non-binary manner whether and how much partners influence a sale, and reports the true attribution. The reported true attribution allows partnership teams to get credit for the deals their partners influenced, and to evaluate the effectiveness of their partnership in generating or creating net new pipeline, or in moving a business metric in a positive direction.

A method of determining and/or attributing an influence that a partner has on revenue from an account is provided herein. In an embodiment, the method includes receiving, by one or more processing devices of a computing system, activity data indicating one or more interactions between an account and a partner. The one or more processing devices of the computing system determine, based on the activity data, an influence that the partner has on revenue from the account. A report is transmitted by the one or more processing devices. For example, the report can include influence data indicating the influence that the partner has on the revenue from the account. The report can be displayed by a display of a computing system. The displayed report can include an activity timeline including the one or more interactions between the account and the partner. Optionally, the displayed report can include a value, e.g., a monetary value, of the influence that the partner has on the revenue.

The one or more processing devices of the computing system can identify, based on data received from the partner, a partnering opportunity. Identifying the partnering opportunity can include determining that the account is an overlapping account of the partner and a second partner. In an embodiment, the data received from the partner includes a data file from a customer relationship management application. The data received from the partner can be used to validate the partnering opportunity. For example, validating the partnering opportunity can include determining that the partner requested an introduction to the account from the second partner.

In an embodiment, account status information corresponding to the account is requested from the partner. Furthermore, results of the partnering opportunity can be reported. Reporting results may include updating the partner influence on the account based on the requested account status information.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings.

FIG. 6 is a pictorial view of a report being displayed by a computing system that indicates an influence that one or more partners has on one or more accounts of a partner ecosystem, in accordance with an embodiment.

DETAILED DESCRIPTION

Embodiments describe a system and method of determining, reporting, and displaying an influence that a partner has on revenue from a customer. The system and method can be used in tracking and calculating attribution to assign true attribution to a partner for influence on sales, for example. However, the system and method may also be used to attribute credit to a partner for influence on outcomes other than revenue. Thus, reference to the system as being used for attribution of influence on sales or revenues is not limiting.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

In an aspect, a system and method to facilitate and track collaborative interactions of partners is provided. The system and method can be embodied in a partner influence engine that collects data representing an activity history of the partners. The activity history can be for one or more partners that share accounts. Accordingly, the activity history includes data that indicates attribution of one or more, e.g., all, partners that are potentially contributing to the account. The partner influence engine determines, based on the activity data, a degree to which each of the partners influenced sales or revenue from a customer. Furthermore, the partner influence engine can report and display the determined influence in a user interface view that shows both the activity history touch points associated with the sale or revenue, and the partners and their influence on the sale or revenue. Accordingly, the partner influence engine has the ability to monitor interactions between partners and customers, determine an influence of those interactions on sales to the customers, and attribute credit for the sales in a non-binary manner to the partners that influenced the revenue.

Figure 1:
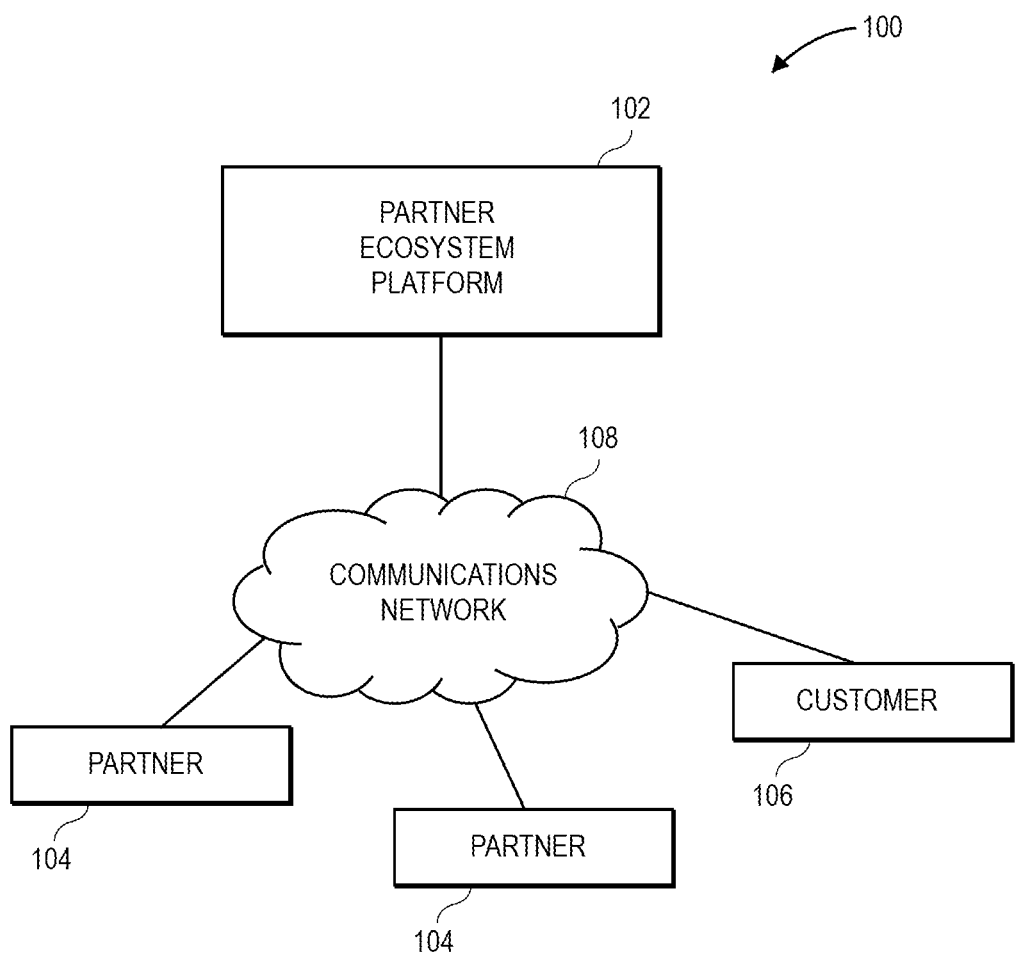
FIG. 1 is a block diagram of an example environment for attributing an influence that a partner has on revenue from a customer, in accordance with an embodiment.

Referring to FIG. 1, a block diagram of an example environment for attributing an influence that a partner has on revenue from a customer is shown according to an embodiment. As shown, the environment 100 includes a partner ecosystem platform 102 that is interconnected with one or more partner devices 104 and/or one or more customer device 106 via a communications network 108. The communications network 108 may be the internet, a wide area network (WAN), intranet, or other suitable network. The partner ecosystem platform 102 may be hosted on one or more local servers, may be a cloud based system, or may be a hybrid system with local servers and in the cloud. The partner ecosystem platform 102 is maintained by engineers which develop features and tools, such as an account mapping interface for partners of the partner ecosystem to interface with the partner ecosystem platform 102.

Although FIG. 1 shows only a select number of computing devices and/or systems (e.g., partner ecosystem platform 102, two partner devices 104, and one customer device 106), the environment 100 may include any number of computing devices and/or systems that are interconnected in any arrangement to facilitate the exchange of data between the computing devices and/or systems.

Figure 2:
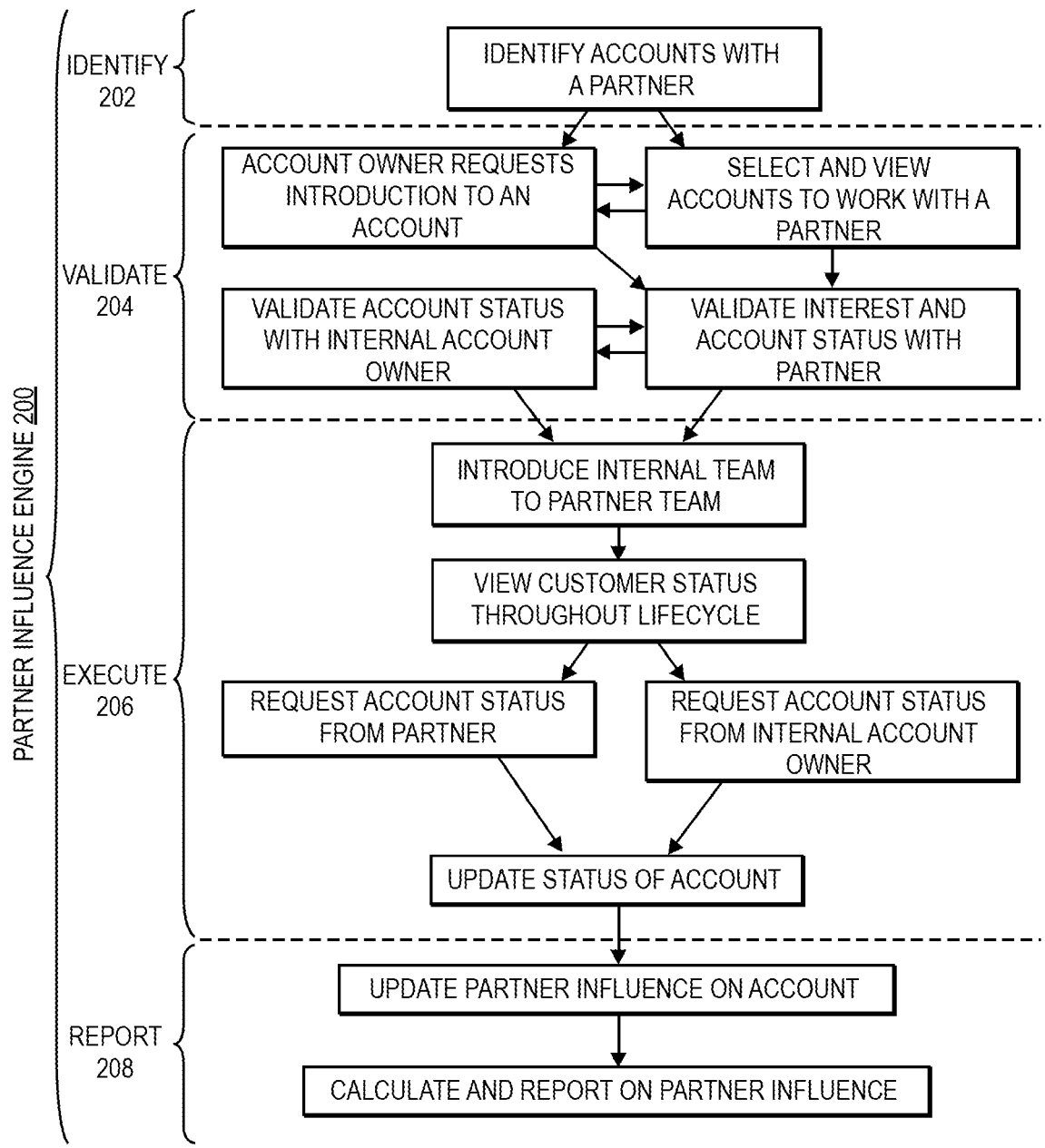
FIG. 2 is a block diagram of a methodology used by a partner influence engine to determine and report an influence that a partner has on revenue from a customer, in accordance with an embodiment.

Referring to FIG. 2, a block diagram of a methodology used by a partner influence engine to determine and report an influence that a partner has on revenue from a customer is shown in accordance with an embodiment. The partner influence engine 200 includes one or more tools or features of the partner ecosystem platform 102. More particularly, the partner influence engine 200 may be embodied in a set of instructions stored on a non-transitory computer readable medium that, when executed by one or more processing devices of the partner ecosystem platform 102, performs the methods described herein. Accordingly, the partner influence engine 200 can include a set of features or tools within the partner ecosystem platform 102 that use data from disparate sources, which are used in day-to-day workflow of the partners, to determine a level of influence that specific partners have on sales to the customer that generate revenue for the partners. Accordingly, the partner influence engine 200 can determine true attribution of the partners automatically and granularly.

The partner influence engine 200 can manage partner attribution through a methodology that includes identifying partnering opportunities. The methodology can include validating the partnering opportunities. The methodology can include executing on the partnering opportunities. The methodology can include reporting the results of the partnering opportunities.

An identification phase 202 of the workflow includes identifying accounts of a first partner and a second partner. The accounts can be overlapping accounts. The partner ecosystem platform 102 includes tools and features that are developed to map accounts of partners in order to find such overlaps. The accounts may be non-overlapping accounts. Accordingly, the partner influence engine 200 can identify, based on data received from one or more of a first partner or a second partner, that the customer has a shared relationship with the partners.

A validation phase 204 of the workflow includes selecting and viewing accounts to work on with a partner. The viewing and selection may occur on a first partner device. The first partner device may then request an introduction to an account, e.g., an introduction to the customer, from the second partner device. The partner influence engine 200 maintained by the partner ecosystem platform 102 may then validate an interest and account status of the customer with both the first partner and the second partner.

An execution phase 206 of the workflow includes introducing a team of the first partner to a team of the second partner. For example, an introduction may be made between a sales representative of the first partner, e.g., Company A, and a sales representative of the second partner, e.g., Company B.

As described below, the partner influence engine 200 can monitor customer status throughout a lifecycle of the sales process. This can include gathering data from the partners through collaboration features and integrations with tangential tools that feed data from the partner devices to the partner ecosystem platform 102. The partner ecosystem platform 102 may also request account status information from the first partner and the second partner. Such information can be communicated from the partner devices 104 to the partner ecosystem platform 102.

A reporting phase 208 of the workflow includes using the data gathered from the partners during the execution phase 206 to update a partner influence on the customer account. The disparate data gathered from the partners may be used to determine an influence of one or both of the partners on a change in the customer account status. For example, contributions of the second partner to a closing of a deal between the first partner and the customer may be calculated based on interactions between the second partner and the customer throughout the sales lifecycle process.

The partner influence can be calculated and reported for viewing by the partner devices. For example, as described below, interactions between the partners and the customer can be displayed on a timeline along with a measure of the influence that each of the partners had on the customer account revenue, sales, etc.

Figure 3:
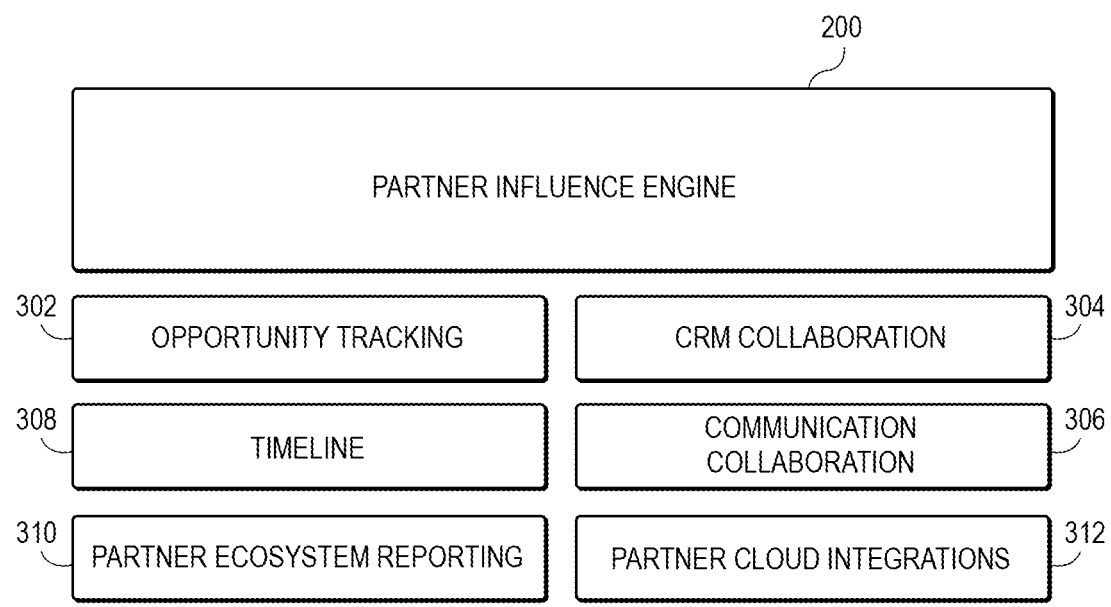
FIG. 3 is a block diagram of application features of a partner influence engine used to determine and report an influence that a partner has on revenue from a customer, in accordance with an embodiment.

Referring to FIG. 3, a block diagram of application features of a partner influence engine used to determine and report an influence that a partner has on revenue from a customer is shown in accordance with an embodiment. The partner influence engine 200, which receives activity data indicating interactions between partners and customers, determines an influence of partners on revenue from the customers, and reports the influence on the revenue to the partners, can have several application feature sets. The application feature sets can include opportunity tracking, customer relationship management (CRM) collaboration, communication platform collaboration, timeline, partner ecosystem reporting, and partner cloud integrations feature sets.

An opportunity tracking feature set 302 of the partner influence engine 200 can include a sweep of user interface and data model features that allow the partner ecosystem platform 102 to use opportunity-level data flexibly. The opportunity tracking feature set 302 can use revenue data, and not only deal counts, when determining return on investment from interactions between partners and customers and attributing influence of those interactions on revenue.

The opportunity tracking feature set 302 can allow a user to view opportunity data in reports. Opportunity data may be data representative of a potential future sale for an account you want to work on or track, or an ongoing transaction that a sales team is pursuing with a contact or company. The partner influence engine 200 can generate and display a report having data fields to allow a user to view opportunities. The opportunities can include opportunities of the user, or opportunities of partners of the user (if the opportunities have been shared). In an embodiment, the report includes aggregate opportunity data for accounts that have several opportunities. The report can provide data on the overall efficacy of a partner program by showing aggregates across partners.

The opportunity tracking feature set 302 can allow a user to view potential partner-influenced revenue. For example, the partner influence engine 200 can generate and display a report having data fields to allow a user to view aggregate monetary values based on opportunities that exist on accounts. The aggregate monetary values can be attributable and viewed in relation to potential influence (open opportunities), won influence (closed/won opportunities), and lost influence (closed/lost opportunities). The aggregated monetary values can provide information that may be useful in evaluating the potential of a partnership.

In an embodiment, the opportunity tracking feature set 302 can allow partner opportunities to be viewed through a CRM application. For example, partner opportunities data can be shared with the CRM application. The partner opportunities data can then be viewed through the CRM application.

Similarly, the opportunity tracking feature set 302 can allow partner overlaps by opportunity to be viewed through a CRM application. For example, overlaps of potential future sales or an account may be viewed through the CRM application.

A CRM collaboration feature set 304 of the partner influence engine 200 can include an interactive application that allows salespeople to take actions, initiate workflows, and record outcomes. Such customer interactions can be monitored by the partner influence engine 200 to determine influence of the interactions on revenue.

The partner ecosystem platform 102 can allow introductions from a CRM application to be requested and/or tracked. Account owners, e.g., account executives, customer service managers, etc., can request introductions into specific accounts either from their own partner manager or the partner manager at the partner company directly (depending on the maturity and nature of the partnership). The partner ecosystem platform 102 can track the introductions and their downstream impacts and activities to determine partner influence. Partner managers may also request introductions into accounts directly to the partner manager or account owner on the partner side. Such requests may be made through a user interface element, e.g., a button, in the CRM application. Selection of the user interface element can route the request through the partner ecosystem platform 102.

The partner ecosystem platform 102 can allow conversations in a CRM application to be created and tracked. Account owners can start a conversation about a specific partner or a specific account with their own partner manager directly (or vice versa). The partner ecosystem platform 102 can then track the conversation. For example, the conversation can be tracked automatically. Alternatively, the conversation can be tracked by manually pushing comments. In addition to tracking the conversation, the downstream impact of the conversation, and activities related to the conversation, can be tracked to determine partner influence.

The CRM collaboration feature set 304 can include an activity inbox. The activity inbox can be an inbox of all CRM-related communication activity in the partner ecosystem platform 102. The inbox can allow users to control what conversations and activities from their CRM application end up on the activity timeline in the partner ecosystem platform 102. The activity inbox can apply to everything that is tracked on the activity timeline. The activity inbox can be used to access important communications about active accounts and/or leads across a portfolio of accounts.

The CRM collaboration feature set 304 can allow a partner relationship object to be created in a CRM application. The partner relationship object can provide a way to track a holistic involvement of a partner in accounts and/or leads. Influence may be attributed to the partner via the partner relationship object. The partner relationship object can be integrated with the partner ecosystem platform 102 for both recording influence and pulling identifying information about the partner back into the partner ecosystem platform 102. When this data is in the CRM application, it can be used by a sales team by using lead scoring based on partner overlap which can then lead to more success by the sales team. As used herein, a sales team includes anyone holding a role specific to generating or increasing revenue at a company. The sales team can include an account owner. More particularly, the account owner is a specific owner from the sales team. The account owner is primarily responsible for the revenue of a given account or accounts.

A communication platform collaboration feature set 306 of the partner influence engine 200 can include spin up shared channels, sync communication, and event tracking data. Such data can be sent to the partner ecosystem platform 102 to help bring sales representatives into the fold of partner collaboration.

The communication platform collaboration feature set 306 can allow account owners to be tagged in a collaboration tool. Account owners that are tagged in the collaboration tool on overlapping accounts get direct, immediate notifications about accounts they can potentially request information from a partner on, or accounts they could offer to help a partner with. All relevant parties can be involved without a partner manager having to tap everyone individually.

The communication platform collaboration feature set 306 can create and track conversations in a collaboration tool. Account owners can start a conversation about a specific partner for a specific account with their own partner manager directly (or vice versa). The partner ecosystem platform 102 can then track the conversation (automatically or by manually pushing comments) and the downstream impacts and activities to understand partner influence. Not only can account owners and partner managers collaborate directly, they can also collaborate with their counterparts at a partner company via the collaboration tool channels that include the partner's employees of the partner.

The communication platform collaboration can push messages from a collaboration tool to the partner ecosystem platform 102. To reduce noise in automatically recording conversations from the collaboration tool, a user can selectively push a message from the collaboration tool into an activity timeline of a specific account in the partner ecosystem platform 102. The message could provide an update or important context about the account that may impact the involvement of the partner in the account and/or lead.

The communication platform collaboration feature set 306 can request and track introductions from a collaboration tool. Account owners can request introductions into specific accounts either from their own partner manager or the partner manager at the partner company directly (depending on the maturity and nature of the partnership). The partner ecosystem platform 102 can then track the introductions and their downstream impacts and activities to understand partner influence. Partner managers may also request introductions into accounts directly to the partner manager or account owner on the partner side via a user interface element, e.g., a button, in a CRM application. Selection of the user interface element would cause the request to be routed through the partner ecosystem platform 102.

The communication platform collaboration feature set 306 can provide internal messaging without a partner in the partner ecosystem platform 102. Account owners can start a conversation about a specific partner for a specific account with their own partner manager directly (or vice versa). The account managers can then involve the partner in the conversation after the account managers have established that an account is a good target for a partner. The account managers can keep their messages with the partner private, if desired. The partner ecosystem platform 102 can then track the conversation (automatically or by manually pushing comments) and the downstream impacts and activities may also be tracked to understand partner influence.

The interactions between partners and customers may include interactions between: (1) a first partner (Company A) and a customer or prospective customer; (2) a second partner (Company B) and a customer or prospective customer; (3) the first partner and the second partner; (4) a first representative, e.g., a partnership manager, of the first partner and a second representative, e.g., a sales representative, of the first partner; or (5) a first representative, e.g., a partnership manager, of the second partner and a second representative, e.g., a sales representative of the second partner. These interactions are not exhaustive, however, and interactions being monitored can include any interactions or activities taken by principals, representatives, or agents of any partner and/or customer associated with an account.

The communication platform collaboration feature set 306 can provide collaborative static reports in the partner ecosystem platform 102. Users can collaborate on reports live in the partner ecosystem platform 102 with the partner. This could involve partner managers at a user and/or partner's company, or account owners from a user. A set of accounts can be selected and notes and tags on those accounts can be shared in a shared report view.

A timeline feature set 308 of the partner influence engine 200 can provide an event stream of data associated with each overlapping account. The timeline can include changes in account status, interactions between companies and their representatives, information from third-party applications, etc. The timeline can provide a system of record for partner influence on every deal that is made in the partner ecosystem.

The timeline feature set 308 can allow activity from a collaboration tool to be viewed on a timeline in the partner ecosystem platform 102. All collaboration tool activity can be viewed on the activity timeline for an account in the partner ecosystem platform 102. Such activity can include conversations about relevant accounts, messages pushed to activity timelines or introductions requested.

The timeline feature set 308 can allow CRM activity to be viewed on an activity timeline in the partner ecosystem platform 102. All CRM activity can be viewed on the activity timeline for an account. The CRM activity can include conversations about relevant accounts, introductions requested, interactions from a sales team with a CRM application of the partner ecosystem platform 102, and any updates to relevant objects in the CRM application. For example, opportunity updates, account owner changes, etc., may be updates that can be viewed on the activity timeline.

The timeline feature set 308 can allow activities to be manually added to the activity timeline. Activities can be added to the timeline and associated with the partner. The added activities may then be used to calculate partner influence.

The timeline feature set 308 can include an activity timeline API. The API can expose the activity timeline data to be used downstream in extraction, transformation, and loading (ETL) tools, data warehouses, and analytics tools.

The timeline feature set 308 can allow partner influence to be manually attributed in the partner ecosystem platform 102. Users of the partner ecosystem platform 102 may be allowed to manually attribute partner influence. Manual attribution may include overwriting or augmenting the attribution calculated by the partner influence engine 200 of the partner ecosystem platform 102. As an example, a partner may mark an activity within a timeline, e.g., a thread activity, as being indicative of an influence on an opportunity. The marking, which is performed manually, can be used in addition to automatic marking or determination of influence as performed by the partner influence engine 200. More particularly, the partner influence engine 200 can use the manual marking of influence, in addition to other activity data suggesting influence, to determine partner influence as described herein.

The timeline feature set 308 can automatically calculate partner attribution (influence). The calculated partner attribution may be the end result of the partner influence engine 200. The influence can be automatically calculated based on all of the activities and touch points throughout an account and/or leads existence.

The timeline feature set 308 can allow overlapping accounts and leads to be viewed in the partner ecosystem platform 102. The partner influence engine 200 can work on non-overlapping accounts. If a partner passes a new lead to another partner, it may end up being sourced by the other partner, but influenced by another partner at a later point. If the partners are not overlapping, they may not be viewed in the partner ecosystem platform 102, and thus, attribution may not be properly assigned. The timeline feature set 308 can allow users of the partner ecosystem platform 102 to share and view non-overlapping accounts with other partners to ensure that attribution is properly assigned. A partner ecosystem reporting feature set 310 of the partner influence engine 200 can use data from the timeline to build a reporting engine for partner source revenue, partner influence revenue, surfacing high-value opportunities, or partner prioritization.

The partner ecosystem reporting feature set 310 can include partner page metrics. The metrics can include per-partner metrics that show and influence a partner has had on all accounts. Aggregate metrics related to activity and engagement by a partner and with a partner (by various members of an internal team) can be shown. For example, the partner page metrics may display a name of a top representative who is engaged with a particular partner, e.g., Partner A.

The partner ecosystem reporting feature set 310 can include a full command center that shows aggregate influence across an entire partner ecosystem. Examples include: top influential partner, total revenue influence by partners, total activity and engagement by partners or with partners, or top engagement from internal employees with partners.

The partner ecosystem reporting feature set 310 can include an API for partner influence calculated by the partner influence engine 200. The feature can expose partner influence calculated by the partner influence engine 200 via the API to be used in downstream systems, such as ETL tools, data warehouses, or analytics tools.

The partner ecosystem reporting feature set 310 can push partner influence to a CRM application. Pushing the partner influence calculated by the partner influence engine 200 to the CRM application may be used by the CRM application for reporting.

A partner cloud integrations feature set 312 of the partner influence engine 200 can allow partners and customers to innovate and build on top of the data and other feature sets of the partner influence engine 200. The partner cloud integrations can also be a source of input data to the activity history. For example, cloud integrations that feed interactions that happen in external tools may be fed back into the partner ecosystem platform 102 for use in determining influence.

Figure 4:
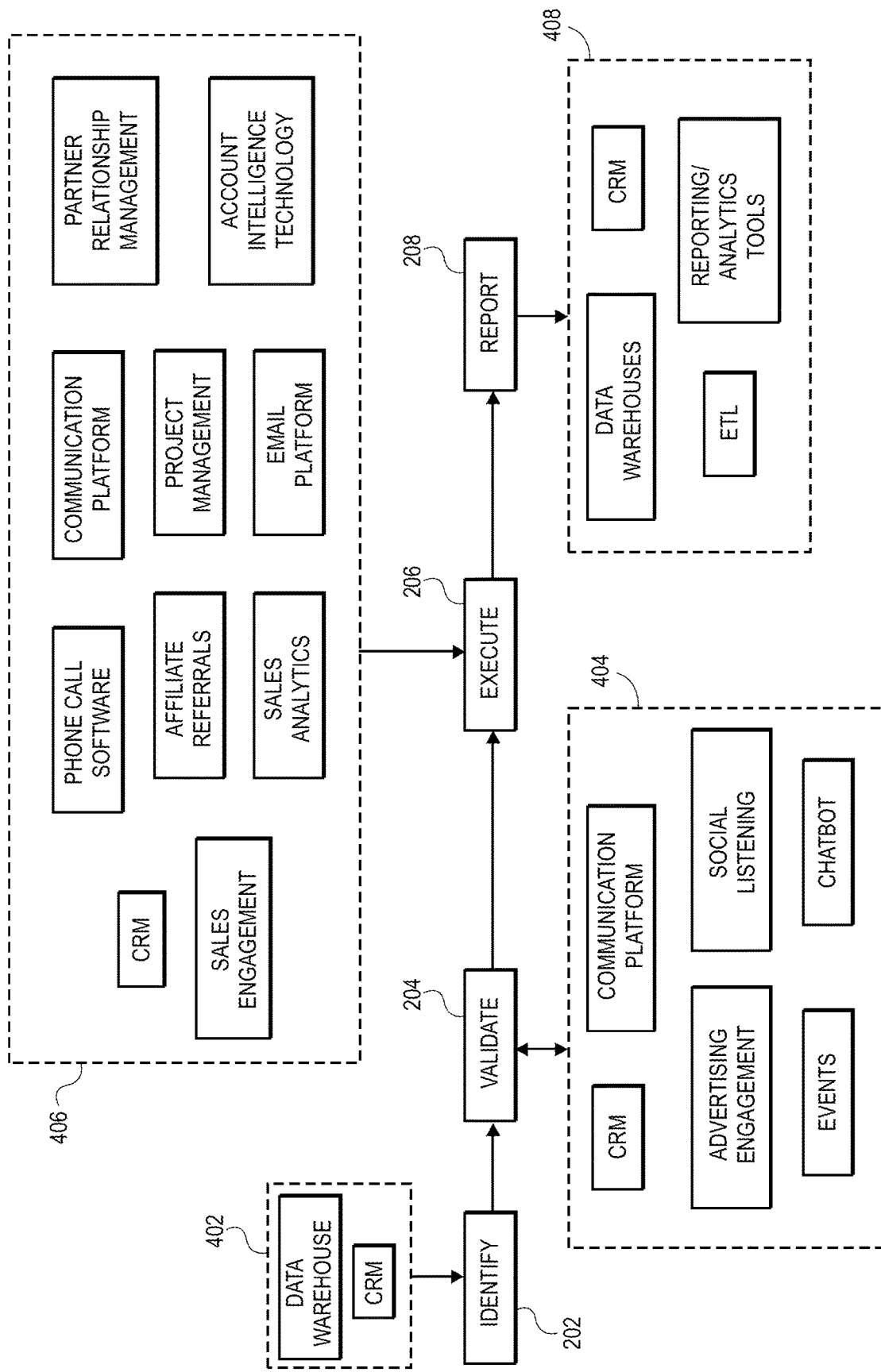
FIG. 4 is a block diagram of data flow within a partner influence engine used to determine and report an influence that a partner has on revenue from a customer, in accordance with an embodiment.

Referring to FIG. 4, a block diagram of data flow within a partner influence engine used to determine and report an influence that a partner has on revenue from a customer is shown in accordance with an embodiment. In the identification phase 202, the partner influence engine 200 can receive data from various sources to identify overlaps. More particularly, a first data set 402 may be received from tools that partners/customers use in day-to-day workflow. Such data can include data files from CRM software, spreadsheet files (e.g., comma-separated value files), etc. The received data can be used to identify a customer as an overlap of a first partner and a second partner. The first data set 402 received during the identification phase 202 can include accounts and leads from CRM services. The accounts and leads can be used to find matches and/or overlaps with accounts and leads of a partner. More particularly, the first data set 402 can provide the data that is used to determine matches and/or overlaps between accounts and leads of the first partner and accounts and leads of the second partner.

In the validation phase 204, the partner influence engine 200 can receive data from various sources to validate the partnership opportunity. In an embodiment, the partner influence engine 200 can receive and/or transmit data from the partner devices. For example, the CRM services and/or communication platforms can report the data to the partner influence engine 200. The data may be included in a second data set 404. The second data set 404 can include data from CRM services, account-based marketing platforms, customer experience management platforms, event management platforms (e.g., platforms for managing digital and/or physical events), conversational marketing platforms (e.g., chatbots), communication platforms, etc.

In an embodiment, the second data set 404 includes data from the CRM system. Data that exists in the CRM systems can include a stage of a specific deal, a value of an opportunity attached to the deal, or any other information around the opportunity data. The data from the CRM services can allow for partner attribution tracking and activities, and can indicate a change of status of the customer, and addition of a new partner to a deal, etc.

The second data set 404 may include data from an account-based marketing platform. An account or lead may click on an ad focused on a specific tech integration with a partner through the account-based marketing platform. Such action may suggest potential influence from the partner for the account and/or lead downstream. It may also be an opportunity to identify a good lead to pass the partner to if no overlap with the partner for that account and/or lead currently exists.

The second data set 404 may include data from a customer experience management platform. For example, a partner may share information about another partner's brand. The shared information can result in the conversion of an account or a lead. Such conversion can be identified as having a downstream impact after the sharing event. More particularly, the partner can be credited with having influence in the accounts/leads that are impacted.

The second data set 404 may include data from event management platforms. A contact in account or lead may attend an event that is co-hosted by a partner. Downstream impact (conversion of the account and/or lead) after the event may indicate that the partner had influence in the impact. More particularly, any impact to the accounts and/or leads that comes from the event may indicate partner influence in the impact.

The second data set 404 may include data from conversational marketing platforms. For example, an employee of a specific account or lead may engage with the chat bot about a specific integration with a partner. The engagement can provide a signal that the partner may have influence on downstream impact of the specific account or lead.

The second data set 404 may include data from communication platforms. Data received from communication platforms can include communications with partners, new conversations started between the partners and/or customer, or activity in a group thread used by the partners and/or customer.

Notably, data may be communicated bi-directionally between the partner influence engine 200 and the sources of the second data set 404. More particularly, data may be transmitted from the partner ecosystem platform 102 to the CRM services, account-based marketing platforms, customer experience management platforms, and/or communication platforms via the communications network 108. Accordingly, the partnership opportunity may be validated by either the partner ecosystem platform 102 or the communicating platforms, e.g., the CRM services, since the data needed to perform validation can be stored by both platforms.

In the execution phase 206, the partner influence engine 200 can receive activity data from tools that partners/customers use in day-to-day workflow. The activity data can indicate one or more interactions between the customer and the partners. For example, the activity data can indicate how sales people of the partners interact with the tools while developing or managing a relationship with the customer.

The activity data received by the partner influence engine 200 can be gathered from features built into the tools used for interactions of members of the partners or customer. As described above, interactions can include any activities taken on behalf of a partner or customer in association with an account or lead. For example, interactions can be between a partner and a customer. Interactions can be between a first partner and a second partner. Interactions can be between members of a partner, e.g., between employees of a same company. The tools can provide the activity data to the partner influence engine 200 in a third data set 406. The activity data can be gathered from several applications having features built into the product that allows salespeople to interact with customers and each other.

In an embodiment, the third data set 406 includes data from a sales engagement platform. The sales engagement platform can provide data representative of tasks that are created in sales enablement tools and templates that are provided for outreach to partner contacts. These templates can provide a better chance of converted opportunities. Thus, the use of the templates can be tracked and used to attribute partner influence.

The third data set 406 may include data from a sales analytics platform. The sales analytics platform can feed data to the partner ecosystem platform 102 to fuel deeper sales collaboration. When activity happens in the sales analytics platform in the future, data representative of the activity can be fed back to the partner ecosystem platform 102 to denote influence. The sales analytics platform can entail account-owner-to-account-executive collaboration of accounts that the partner ecosystem platform 102 has identified as a co-selling opportunity. The sales analytics platform may be in essence a map of a business-to-business account. This may be likened to a tree of the humans at the company and account executives can share notes about who is an ally or who is not within the tree.

In an embodiment, the third data set 406 includes data from CRM software. The CRM software may send activity data indicating a change of status of the customer, or any updates to opportunities or changes in account ownership, to the partner influence engine 200. An example of activity data provided by the CRM tool can relate to a feature within the CRM application that allows a representative to view a particular account and within the account view partners that have been identified as overlapping for the account. The activity data can include data that is collected when a salesperson interacts with, e.g., clicks or otherwise engages with, partner data that shows the overlapping partner having influence. The activity data can represent activity throughout the partner lifecycle that is updated in a CRM application. This includes recording partner activity on account/lead back in the CRM application. For example, if an opportunity on a partner account is updated, the update can be sent back to the CRM application. Any partner overlap (potential involvement) that comes from an overlap identified in the partner ecosystem platform 102 can be recorded in the CRM application.

In an embodiment, a communication platform may send activity data containing information about communications with partners, new conversations started between partners or customers, or activity in a group thread. For example, the phone call application can provide data indicating whether a person attended a call with an overlapping partner and mentioned the account they are working with. Similar to the CRM application, the communication platform may collect data indicating whether a salesperson is surfacing information showing an overlapping partner and/or engaging with such information. If the representative interacts with, e.g., clicks on, an overlapping partner, it can be reported as activity data that is potentially important to showing influence of the overlapping partner.

In an embodiment, the third data set 406 includes data from phone call software. The phone call software may send activity data indicating when a partner is mentioned during a call. For example, a representative of Company B may be on a phone call with a prospective customer using a phone call application, and the representative may mention the name of Company A or a representative thereof. Additionally, activities on any calls that happen with the partner (partner manager or account owner at the partner company), or calls that happen with an account that is actively overlapping with a partner, regardless of partner mention, could point to potential influence (downstream or upstream) from the partner. Speech recognition features built into the phone call application can detect the name and send the name as activity data to the partner influence engine 200.

In an embodiment, the third data set 406 includes data from a project management application. The project management application may send activity data to the partner influence engine 200. The activity data may contain information about human collaboration (with a partner) within the tool. For example, the project management tool can provide data indicating whether a lead was registered that is already an overlap of the partners. Collaboration about a specific set of accounts or leads may happen in a project management tool. For example notes may be added, account or opportunity statuses may be updated, or other actions may be taken. The partner ecosystem platform 102 can push any updates into the project management tool for further collaboration.

In an embodiment, the third data set 406 may include data from an email platform. The email platform may send activity data to the partner influence engine 200. The activity data may include information tracking partner engagement on communications with go-to-market teams. The email platform can perform a search for partner email domains and provide the email domains as activity data. Partner engagement may be tracked by looking for partner email domains in emails. Accordingly, data from the email platform can be used to identify how partners are involved in active opportunities with their own internal teams.

The third data set 406 may include data from a partner relationship management platform. A partner relationship management application may send activity data to the partner influence engine 200. For example, the activity data may contain information about a partner submitting a deal for deal registration, and/or a change of status on the partner side. The partner relationship management platform can provide data representative of deal registration. A partner can submit a deal to a company which would be either partner source or influenced, depending on whether it already exists in CRM data. The partner can submit a status change to existing submitted deal. This activity can display in the partner ecosystem platform 102 and be used to calculate partner influence. Additionally, partner ecosystem platform 102 overlapping (and non-overlapping) accounts can be shown in the partner relationship management platform. Accordingly, a user can select and send/request leads to/from partners.

In an embodiment, the third data set 406 includes data from an account intelligence technology application. The account intelligence technology application may send activity data to the partner influence engine 200. The activity data may contain information about sales cycle health. For example, the activity data may provide information about whether a contact has left an account or lead. Third party account intelligence information can be viewed in the partner ecosystem platform 102 to understand whether the health of an account changes because of the change. For example if a contact leaves at an account, it may change the ability to successfully work that account with a specific partner.

An integration can be built with each of the applications that provide activity data to the partner influence engine 200. More particularly, in some cases, a user of the applications may be able to authenticate the applications within the partner ecosystem platform 102. Authenticating the application can allow the partner influence engine 200 to pull data from the application for analysis. Authentication of the applications is not necessary, however. For example, activity data may be provided by the applications and by third parties for use by the partner influence engine 200. In any case, the partner influence engine 200 can receive the activity data indicating interactions with the customer that provides revenue to one or more of the partners, and use the activity data to determine partner influence.

Notably, the activity data can be gathered automatically from sales representatives, without the need to manually reach out to representatives for information. Such automatic and transparent data gathering can provide a more efficient and accurate method of determining influence of a partner in a sale.

In an embodiment, the partner influence engine 200 can determine, based on the received activity data, an influence that one or more of the partners has on the revenue from the customer. The partner influence engine 200 can weight different activity data as being more or less important to a level of influence. The weighting of various kinds of activity data, e.g., mentioning a sales representative during a phone call versus attending an event of a customer, may be customized within the partner ecosystem platform 102.

The analysis of influence by the partner influence engine 200 can determine true attribution in a non-binary manner. For example, influence may be determined as a level, e.g., a "low," "medium," or "high" level of influence. The level of influence may also be determined as a percentage of influence, for example. In an embodiment, the percentage of influence may be used to allocate portions of revenue that are attributable to the partners. For example, when partners co-sell to a customer, a dollar amount for which the partners are responsible vis-à-vis their contribution to the sale can be determined.

In the reporting phase 208, the partner influence engine 200 can transmit a report including influence data indicating the influence that the partners had on revenue. The report may be provided as reporting data included in a fourth data set 408. The report can be sent to various applications for display to a user of the applications. More particularly, the applications can be integrated with the partner ecosystem platform 102 to receive and display the report generated by the partner influence engine 200.

In an embodiment, a data warehouse application is used to display the report. Data warehouses power analytics tools used for company-wide reporting and dashboards. The partner ecosystem platform 102 can push data into data warehouses to be combined with other company data and using analytics and reporting. Raw overlap data can be reported on with data from other systems in one place. The partner ecosystem platform 102 can also send data back from the other integrations described herein to a data warehouse. That data can be used for easy reporting centered around the partners involved in the accounts and leads. This includes data from partners from any of the above systems. For example, conversations/interactions from partner employees on a communication platform may be included in the data.

In an embodiment, an ETL application is used to pass data to tools that display the report. ETL tools provide a streamlined way to move data into data warehouses or analytics tools. Accordingly, ETL tools provide a streamlined way to move data from the partner ecosystem platform 102 into data warehouses or analytics tools without bespoke integrations. The use cases for ETL applications are similar to those described above with respect to data warehouses.

In an embodiment, CRM software is used to display the report. The CRM application may have native reporting that the report from the partner influence engine 200 may be used to augment. More particularly, existing reports generated by the CRM application can include information contained in the report. The CRM application can have native reporting functionality built-in. The partner ecosystem platform 102 pushes data about partners involved in account/leads which can be used to report on partner influence. The partner ecosystem platform 102 can also send back data from any of the above integrations to a CRM application for easy reporting centered around the partners involved in the accounts and leads. This includes data from partners from any of the above systems. For example, conversations/interactions from partner employees on a communication platform can be included in the data. In an embodiment, the partner ecosystem platform 102 pushes the actual influence of partners to be reported.

In an embodiment, a reporting/analytics tool is used to display the report. Data often flows from data warehouses into reporting/analytics tools, but some may have direct connections from the partner ecosystem platform 102. The use cases for reporting/analytics tools are similar to those described above with respect to data warehouses.

Figure 5:
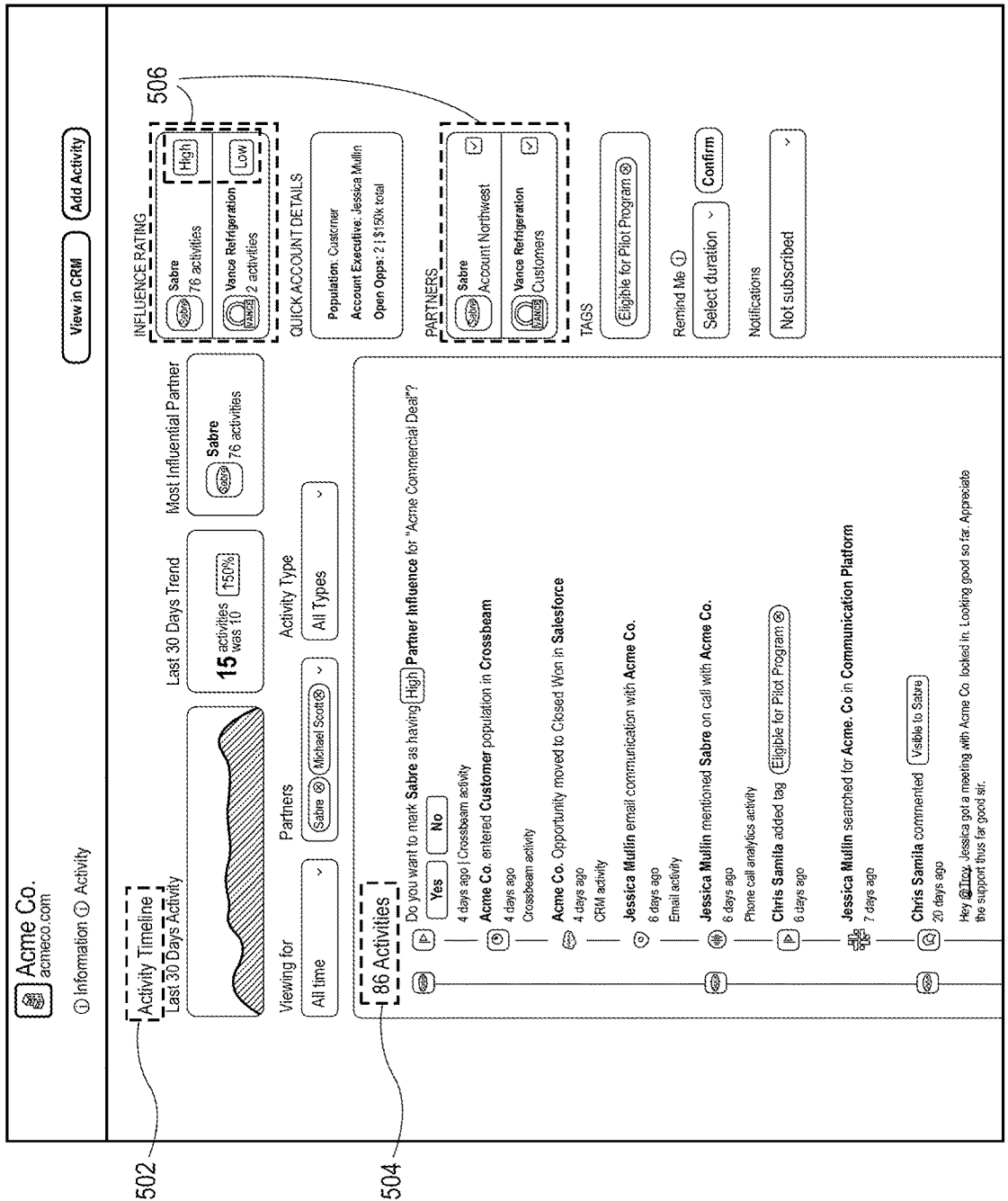
FIG. 5 is a pictorial view of a report being displayed by a computing system that indicates an influence that a partner has on revenue from a customer, in accordance with an embodiment.

Referring to FIG. 5, a pictorial view of a report being displayed by a computing system that indicates an influence that a partner has on revenue from an account is shown in accordance with an embodiment. The report can be received by and displayed within graphical user interfaces provided by the applications. In an embodiment, the report includes an activity timeline 502 that has one or more interactions 504 between the account (a customer or a prospect, lead, etc.) and the partners. The interactions 504 can include the activities described above with respect to the activity data gathered by each of the applications used by the partners and/or account. In addition to the interactions 504, the displayed report can include the partners that are involved in the interactions 504 with the account in a partner grouping 506. Within the grouping, the displayed report may also show the influence that the partners had on the revenue from the customer. For example, the companies represented in the partner influence grouping of FIG. 5 include a company that was determined to have a high influence on revenue from the customer and a company that was determined to have a low influence on revenue from the customer. The displayed report can be used to assess partner contributions and to attribute value of the partners to a deal.

Figure 6:
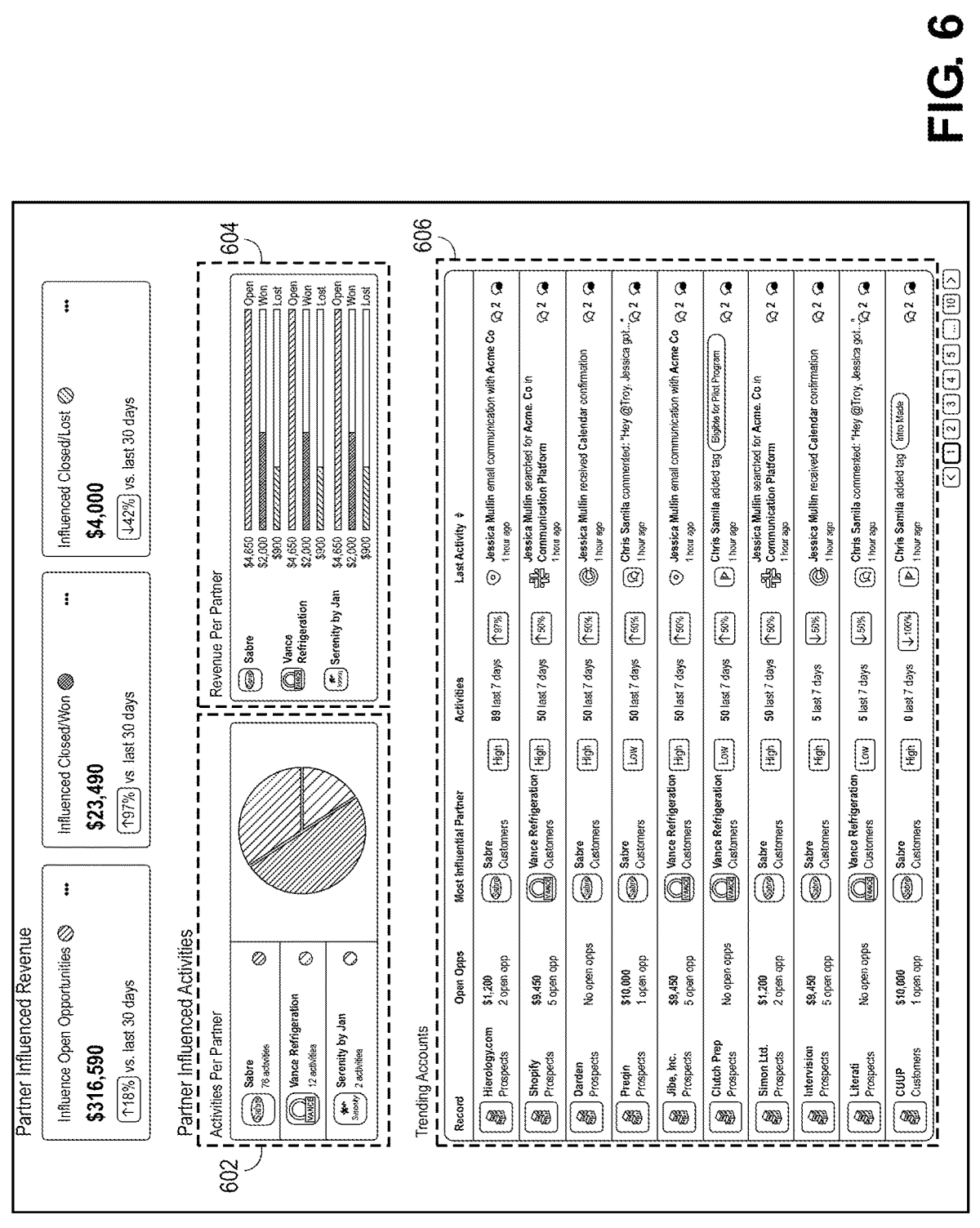

Referring to FIG. 6, a pictorial view of a report being displayed by a computing system that indicates an influence that one or more partners has on one or more accounts of a partner ecosystem is shown in accordance with an embodiment. The report illustrates that attribution can be determined and reported not just for a single partner on a single account, but rather, attribution can be determined and reported for any number of partners over any number of accounts. In an embodiment, influence of a partner over a set of accounts or all accounts in a partner ecosystem is determined and reported. In an embodiment, influence of several partners in the partner ecosystem over one, several, or all of the accounts in the partner ecosystem are determined and reported. Thus, the partner influence engine 200 can track influence over a single account across the partner ecosystem, track influence of a single partner across the entire prospect/customer base, or track influence of all partners across the entire prospect/customer base.

Determination and reporting of influence for several partners and or several accounts can be made through aggregation of activity data and/or attribution results accumulated through the method described above. For example, referring again to FIG. 5, influence of several partners "Sabre" and "Vance Refrigeration" on a single account "Acme Co." is shown. Thus, influence of each partner is determined and aggregated in a report that relates to the single account. Referring again to FIG. 6, partner influence over an entire partner ecosystem is shown. The attribution information displayed includes influence of one, several, or all of the partners, as well as one, several, or all of the customers (current or prospective) in the overall partner ecosystem. For example, attribution for the influence can be represented as partner influenced revenue, e.g., the number of opportunities, influenced closed/won accounts, or influenced closed/lost accounts that a partner or a group of partners has within the partner ecosystem for an account (a customer, prospect, lead, etc.) or a group of accounts.

In an embodiment, the activity data can be received and analyzed to determine partner influenced activity count 602. More particularly, the report can include data for display of the activities per partner of one, several, or all partners in the partner ecosystem.

In an embodiment, the activity data can be used to determine partner revenue data 604. More particularly, the report can include data for display of the revenue per partner of one, several, or all partners in the partner ecosystem.

In an embodiment, the activity data can be used to determine trending account data 606. More particularly, the report can include data for display of the accounts having trending activity data. Trending activity data can include active prospect or current customer names, a value of opportunities related to those customer names, partners that have influenced the opportunities, as well as partner activity data. For example, the partner activity data can indicate a number of activities made by the influential partner on the customer account over a predetermined time period, or a percentage increase/decrease of activity over that time period compared to another predetermined and immediately preceding time period. The trending activity data can also indicate a last activity made by a partner that had influence on the customer account. The activity data can be used to display trending accounts revenue per partner of one, several, or all partners in the partner ecosystem.

Based on the above description, it will be appreciated that the partner ecosystem platform 102 can include the partner influence engine 200 used to identify, validate, execute, and report partner influence or attribution. Attribution can be made for influence of one, several, or all partners in a partner ecosystem over one, several, or all customers (current or prospective) in the partner ecosystem. Attribution may be made for influence expressed in quantitative, e.g., dollar-based, percentage, etc., or qualitative, e.g., high-medium-low, etc., terms. Accordingly, the above description is to be viewed illustrative and not limiting at least in that any description related to determining attribution for a single partner on an account may be extended to determining (and aggregating) attribution for a set of partners on a set of accounts, where a "set" refers to one, several, or all of the partners/accounts in the partner ecosystem.

Figure 7:
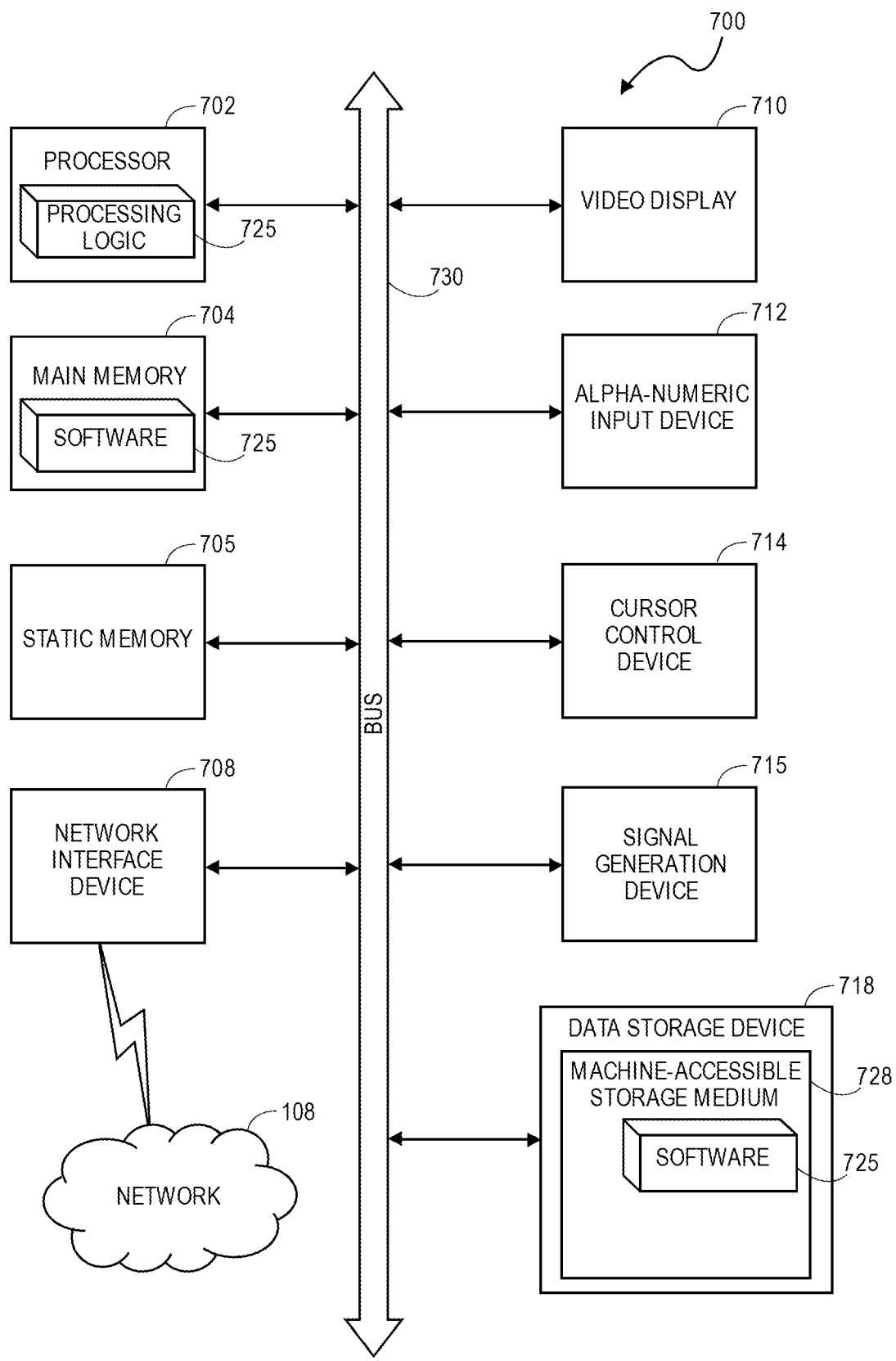
FIG. 7 is a block diagram of an example computing system that may perform one or more of the operations described herein, in accordance with some embodiments.

FIG. 7 is a block diagram of an example computing system that may perform one or more of the operations described herein, in accordance with some embodiments. More particularly, computing system 700 may be integrated in any of the servers and/or devices described above to perform any of the described operations. Computing system 700 may be connected to other computing devices in a LAN, an intranet, an extranet, and/or the Internet. The computing system may operate in the capacity of a server machine in the client-server network environment or in the capacity of a client in a peer-to-peer network environment. The computing system may be provided by a personal computer (PC), a set-top box (STB), a server, a network router, switch or bridge, or any machine capable of executing a set of instructions (sequential or otherwise) that specify actions to be taken by that machine. Further, while only a single computing system is illustrated, the term "computing device" or "computing system" shall also be taken to include any collection of computing devices that individually or jointly execute a set (or multiple sets) of instructions to perform the methods discussed herein.

The example computing system 700 may include one or more processing devices (e.g., a processing device, a general purpose processing device, a PLD, etc.) 702, a main memory 704 (e.g., synchronous dynamic random access memory (DRAM), read-only memory (ROM)), a static memory 705 (e.g., flash memory and a data storage device 718), which may communicate with each other via a bus 730.

The one or more processing devices 702 may be provided by one or more general-purpose processing devices such as a microprocessor, central processing unit, or the like. In an illustrative example, processing device(s) 702 may comprise a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. Processing device(s) 702 may also comprise one or more special-purpose processing devices such as an application specific integrated circuit (ASIC), a field programmable gate array (FPGA), a digital signal processor (DSP), network processor, or the like. The processing device(s) 702 may be configured to execute the operations described herein, in accordance with one or more aspects of the present disclosure, for performing the operations and steps discussed herein.

Computing system 700 may further include a network interface device 708 which may communicate with a network 108. The computing system 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 715 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions 725 that may include instructions for carrying out the operations described herein, in accordance with one or more aspects of the present disclosure. Instructions 725 may also reside, completely or at least partially, within main memory 704 and/or within processing device(s) 702 during execution thereof by computing system 700, main memory 704 and processing device(s) 702 also constituting computer-readable media. The instructions 725 may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
receiving activity data indicating one or more interactions between one or more accounts and a plurality of partners of a partner ecosystem platform;
determining, based on the activity data, an overlapping account of the one or more accounts;
determining, by a processing device of a computing system based on the activity data, influence data indicating an influence that each of the plurality of partners has on the overlapping account, wherein the influence data includes a qualitative, non-binary measure of a level of the influence based on a weighting of the activity data by type of the one or more interactions between the plurality of partners and the overlapping account;
transmitting, to a remote client device of the computing system, a report including the influence data;
generating, via the remote client device, an interactive user interface including one or more selectable options to allow selection of the report from the one or more selectable options, wherein the report includes an activity timeline including the one or more interactions between the overlapping account and the plurality of partners, wherein the report includes an indicator of the level of the influence that each of the plurality of partners has on the overlapping account, and wherein the indicator includes a high influence term, a medium influence term, or a low influence term corresponding to the qualitative, non-binary measure of the level of influence;
initiating a communication session on the remote client device, wherein the communication session includes a message from a collaboration tool into the activity timeline of a specific account in the partner ecosystem platform via the interactive user interface; and
automatically tracking, on the remote client device, the message via the interactive user interface to allow an update about the specific account that impacts involvement of the plurality of partners in the overlapping account of the one or more accounts.

2. The method of claim 1 further comprising identifying, based on data received from the plurality of partners, a partnering opportunity, wherein identifying the partnering opportunity includes determining that the overlapping account is a shared account of a first partner and a second partner.

3. The method of claim 2, wherein the data received from the first partner includes a data file from a customer relationship management application.

4. The method of claim 2 further comprising validating, based on the data received from the plurality of partners, the partnering opportunity, wherein validating the partnering opportunity includes determining that the first partner requested an introduction to the overlapping account from the second partner.

5. The method of claim 2 further comprising requesting account status information corresponding to the overlapping account from the first partner.

6. The method of claim 5 further comprising reporting results of the partnering opportunity, wherein reporting results includes updating the partner influence on the overlapping account based on the requested account status information.

7. A computing system, comprising:
a memory storing activity data indicating one or more interactions between one or more accounts and a plurality of partners of a partner ecosystem platform; and
a processing device to:
determine, based on the activity data, an overlapping account of the one or more accounts;
determine, based on the activity data, influence data indicating an influence that each of the plurality of partners has on the overlapping account, wherein the influence data includes a qualitative, non-binary measure of a level of the influence based on a weighting of the activity data by type of the one or more interactions between the plurality of partners and the overlapping account;
transmit, a report including the influence data;
generate, via the remote client device, an interactive user interface including one or more selectable options to allow selection of the report from the one or more selectable options, wherein the report includes an activity timeline including the one or more interactions between the overlapping account and the plurality of partners, wherein the report includes an indicator of the level of the influence that each of the plurality of partners has on the overlapping account, and wherein the indicator includes a high influence term, a medium influence term, or a low influence term corresponding to the qualitative, non-binary measure of the level of influence;
initiate a communication session on the remote client device, wherein the communication session includes a message from a collaboration tool into the activity timeline of a specific account in the partner ecosystem platform via the interactive user interface; and
automatically track, on the remote client device, the message via the interactive user interface to allow an update about the specific account that impacts involvement of the plurality of partners in the overlapping account of the one or more accounts.

8. The computing system of claim 7, wherein the one or more processing devices are to identify, based on data received from the plurality of partners, a partnering opportunity, wherein identifying the partnering opportunity includes determining that the overlapping account is a shared account of a first partner and a second partner.

9. The computing system of claim 8, wherein the one or more processing devices are to validate, based on the data received from the first partner, the partnering opportunity.

10. The computing system of claim 8, wherein the one or more processing devices are to request account status information corresponding to the overlapping account from the first partner.

11. The computing system of claim 10, wherein the one or more processing devices are to report results of the partnering opportunity, wherein reporting results includes updating the partner influence on the overlapping account based on the requested account status information.

12. A non-transitory computer readable medium storing instructions which, when executed by a processing device of a computing system, cause the computing system to:
receive activity data indicating one or more interactions between one or more accounts and a plurality of partners of a partner ecosystem platform;
determine, based on the activity data, an overlapping account of the one or more accounts;
determine, based on the activity data, influence data indicating an influence that each of the plurality of partners has on the overlapping account, wherein the influence data includes a qualitative, non-binary measure of a level of the influence based on a weighting of the activity data by type of the one or more interactions between the plurality of partners and the overlapping account;
transmit a report including the influence data;
generate, via the remote client device, an interactive user interface including one or more selectable options to allow selection of the report from the one or more selectable options, wherein the report includes an activity timeline including the one or more interactions between the overlapping account and the plurality of partners, wherein the report includes an indicator of the level of the influence that each of the plurality of partners has on the overlapping account, and wherein the indicator includes a high influence term, a medium influence term, or a low influence term corresponding to the qualitative, non-binary measure of the level of influence;
initiate a communication session on the remote client device, wherein the communication session includes a message from a collaboration tool into the activity timeline of a specific account in the partner ecosystem platform via the interactive user interface; and
automatically track, on the remote client device, the message via the interactive user interface to allow an update about the specific account that impacts involvement of the plurality of partners in the overlapping account of the one or more accounts.

13. The non-transitory computer readable medium of claim 12 further comprising identifying, based on data received from the plurality of partners, a partnering opportunity, wherein identifying the partnering opportunity includes determining that the overlapping account is a shared account of a first partner and a second partner.

14. The non-transitory computer readable medium of claim 13 further comprising validating, based on the data received from the first partner, the partnering opportunity, wherein validating the partnering opportunity includes determining the partner requested an introduction to the overlapping account from the second partner.

15. The non-transitory computer readable medium of claim 13 further comprising requesting account status information corresponding to the overlapping account from the first partner.

16. The non-transitory computer readable medium of claim 15 further comprising reporting results of the partnering opportunity, wherein reporting results includes updating the partner influence on the overlapping account based on the requested account status information.

* * * * *